United States Patent
Modi et al.

(10) Patent No.: US 10,438,071 B2
(45) Date of Patent: Oct. 8, 2019

(54) DISTRIBUTED SYSTEM FOR MINING, CORRELATING, AND ANALYZING LOCALLY OBTAINED TRAFFIC DATA INCLUDING VIDEO

(71) Applicant: Echelon Corporation, Santa Clara, CA (US)

(72) Inventors: Sohrab Modi, Oakland, CA (US); Shalender Singh, Milpitas, CA (US)

(73) Assignee: Echelon Corporation, Santa Clara, CA (US)

( * ) Notice: Subject to any disclaimer, the term of this patent is extended or adjusted under 35 U.S.C. 154(b) by 337 days.

(21) Appl. No.: 15/414,892

(22) Filed: Jan. 25, 2017

(65) Prior Publication Data
US 2018/0211116 A1   Jul. 26, 2018

(51) Int. Cl.
*H04N 7/18* (2006.01)
*G06K 9/00* (2006.01)
(Continued)

(52) U.S. Cl.
CPC ..... *G06K 9/00785* (2013.01); *G06F 16/7837* (2019.01); *G06F 16/7867* (2019.01); *G06F 16/9537* (2019.01); *G06T 7/246* (2017.01); *G08G 1/015* (2013.01); *G08G 1/0116* (2013.01); *G08G 1/0129* (2013.01); *G08G 1/0133* (2013.01); *G08G 1/04* (2013.01); *H04N 7/188* (2013.01); *G06K 2209/15* (2013.01);
(Continued)

(58) Field of Classification Search
CPC .................................. G06K 9/00785
USPC ....................................... 348/149
See application file for complete search history.

(56) References Cited

U.S. PATENT DOCUMENTS 3,685,012 A   8/1972 Case et al.
4,847,772 A   7/1989 Michalopoulos et al.
(Continued)

FOREIGN PATENT DOCUMENTS

EP   2 700 032   3/2016
KR   20100086089   7/2010
(Continued)

OTHER PUBLICATIONS

International Search Report for PCT/US 18/14779 dated Apr. 16, 2018.
(Continued)

Primary Examiner — Leron Beck
(74) Attorney, Agent, or Firm — Locke Lord LLP

(57) ABSTRACT

A distributed system is disclosed for mining, correlating and analyzing locally obtained traffic video data. The system comprises a central controller configured to correlate traffic counting meta data gathered at a thoroughfare, to transmit control information to specify one or more traffic counting events to be monitored by at least one video unit located at the thoroughfare and to receive traffic counting meta data from the at least one video unit. The at least one video unit located at the thoroughfare, is configured to process a video stream from a video camera while monitoring the traffic counting events at the thoroughfare specified by the central controller, to analyze and evaluate the traffic counting event, to encode traffic meta data characterizing the analysis, and to transmit the meta data to the central controller. Further meta data can be acquired by mining the meta data history or any captured raw video footage.

24 Claims, 9 Drawing Sheets

(51) Int. Cl.

| | | |
|---|---|---|
| *G08G 1/01* | (2006.01) | |
| *G06F 16/783* | (2019.01) | |
| *G06F 16/78* | (2019.01) | |
| *G06F 16/9537* | (2019.01) | |
| *G08G 1/015* | (2006.01) | |
| *G08G 1/04* | (2006.01) | |
| *G06T 7/246* | (2017.01) | |
| *H04W 84/12* | (2009.01) | |
| *H04W 84/04* | (2009.01) | |
| *H04W 4/80* | (2018.01) | |

(52) U.S. Cl.
CPC ..... *G06K 2209/23* (2013.01); *G06K 2209/27* (2013.01); *G06T 2207/10016* (2013.01); *G06T 2207/30236* (2013.01); *H04W 4/80* (2018.02); *H04W 84/042* (2013.01); *H04W 84/12* (2013.01)

(56) References Cited

U.S. PATENT DOCUMENTS

| | | |
|---|---|---|
| 5,341,435 A | 8/1994 | Corbett et al. |
| 6,466,862 B1 | 10/2002 | DeKock et al. |
| 6,697,104 B1 | 2/2004 | Yakobi et al. |
| 7,123,166 B1 | 10/2006 | Haynes et al. |
| 7,460,691 B2 | 12/2008 | Ng et al. |
| 7,541,943 B2 | 6/2009 | Manor |
| 7,868,912 B2 | 1/2011 | Venetianer et al. |
| 7,869,935 B2 | 1/2011 | Ma et al. |
| 7,932,923 B2 | 4/2011 | Lipton et al. |
| 8,334,906 B2 | 12/2012 | Lipton et al. |
| 8,339,454 B1 | 12/2012 | Maali |
| 8,358,357 B2 | 1/2013 | Jannard et al. |
| 8,358,808 B2 | 1/2013 | Malinovskiy et al. |
| 8,520,069 B2 | 8/2013 | Haler |
| 8,564,661 B2 | 10/2013 | Lipton et al. |
| 9,159,228 B2 | 10/2015 | Wang et al. |
| 2005/0146605 A1 | 7/2005 | Lipton et al. |
| 2006/0227862 A1 | 10/2006 | Campbell et al. |
| 2008/0112474 A1 | 5/2008 | Refaeli |
| 2010/0054539 A1 | 3/2010 | Challa |
| 2011/0095908 A1 | 4/2011 | Nadeem et al. |
| 2012/0179742 A1 | 7/2012 | Archaya et al. |
| 2013/0113932 A1 | 5/2013 | Lipton et al. |
| 2013/0268654 A1 | 10/2013 | Abraham et al. |
| 2013/0278767 A1 | 10/2013 | Bemarl et al. |
| 2014/0046874 A1 | 2/2014 | Li et al. |
| 2014/0079282 A1 | 3/2014 | Marcheselli et al. |
| 2014/0249742 A1 | 9/2014 | Krivacic et al. |
| 2016/0094399 A1 | 3/2016 | Kish |
| 2016/0125246 A1 | 5/2016 | Ryhorchuk et al. |
| 2016/0127749 A1 | 5/2016 | Chowdhury et al. |
| 2016/0299897 A1 | 10/2016 | Silva et al. |
| 2016/0300489 A1 | 10/2016 | Shafran |

FOREIGN PATENT DOCUMENTS

| | | |
|---|---|---|
| WO | WO 2013151414 | 10/2013 |
| WO | WO 2013187748 | 12/2013 |
| WO | WO 2015009640 | 1/2015 |
| WO | WO 2016048428 | 3/2016 |

OTHER PUBLICATIONS

Lei, Manchun, et al. "A video-based real-time vehicle counting system using adaptive background method." Signal Image Technology and Internet Based Systems, 2008. SITIS'08. IEEE International Conference on. IEEE, 2008.

Hsieh, Jun-Wei, et al. "Automatic traffic surveillance system for vehicle tracking and classification." IEEE Transactions on Intelligent Transportation Systems 7.2 (2006): 175-187.

Salvi, Guiseppe. "An automated vehicle counting system based on blob analysis for traffic surveillance." Proceedings of the International Conference on Image Processing, Computer Vision, and Pattern Recognition (IPCV). The Steering Committee of the World Congress in Computer Science, Computer Engineering and Applied Computing (WorldComp), 2012.

VIDEO UNIT 102(1)

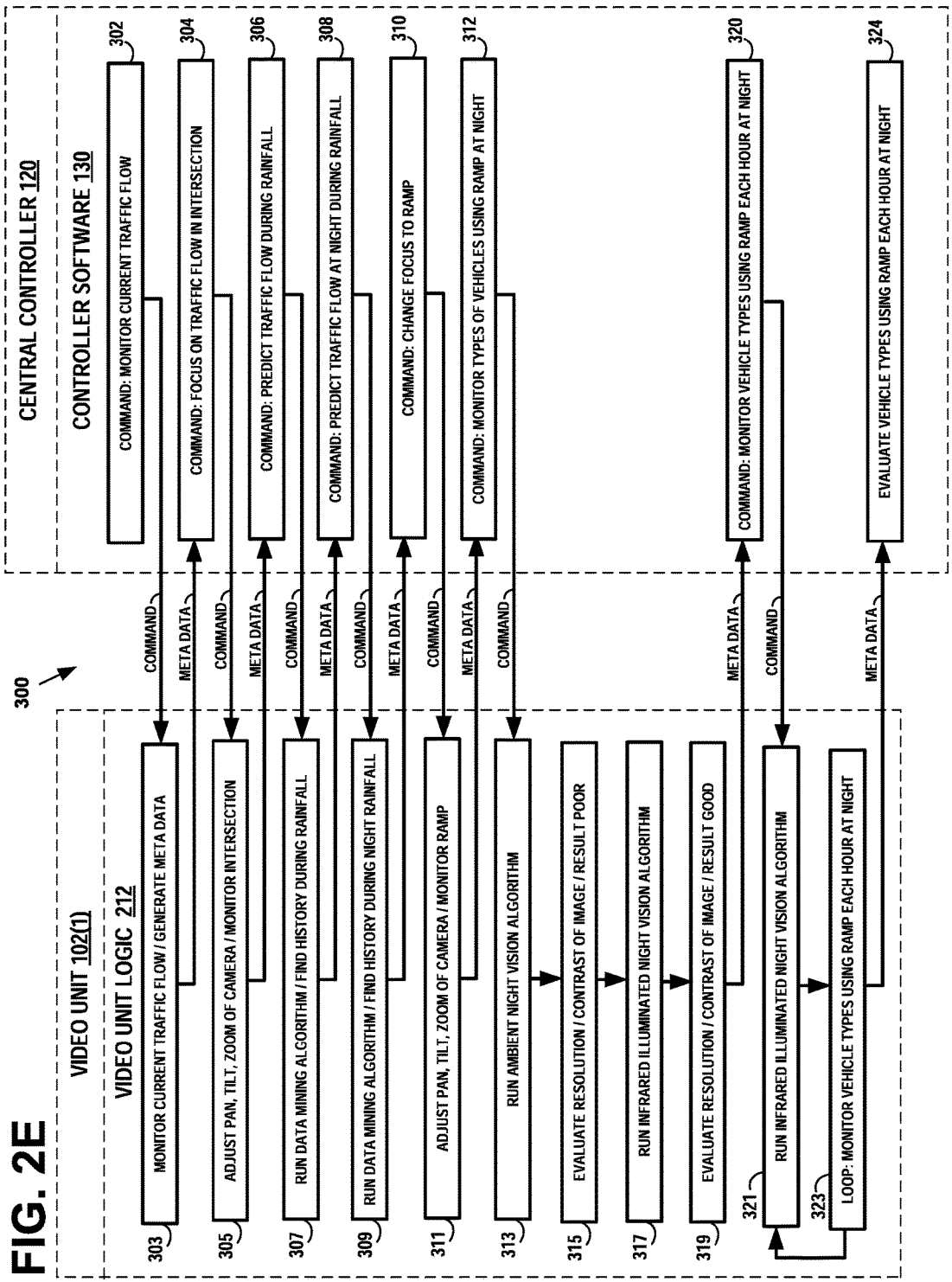

STEP 352: PROCESSING A VIDEO STREAM, BY AT LEAST ONE VIDEO UNIT, WHILE MONITORING TRAFFIC COUNTING EVENTS AT A THOROUGHFARE SPECIFIED BY A CENTRAL CONTROLLER, TO IDENTIFY A TRAFFIC COUNTING EVENT ASSOCIATED WITH THE THOROUGHFARE, TO ANALYZE THE TRAFFIC COUNTING EVENT WITH A FIRST ALGORITHM, AND TO ENCODE TRAFFIC META DATA CHARACTERIZING THE ANALYSIS OF THE TRAFFIC COUNTING EVENT ANALYZED BY THE AT LEAST ONE VIDEO UNIT AT THE THOROUGHFARE, THE AT LEAST ONE VIDEO UNIT TRANSMITTING THE META DATA CHARACTERIZING ANALYSIS OF THE TRAFFIC COUNTING EVENT TO THE CENTRAL CONTROLLER;

↓

STEP 354: RECEIVING, BY THE CENTRAL CONTROLLER, THE META DATA CHARACTERIZING ANALYSIS OF THE TRAFFIC COUNTING EVENT, AND EVALUATING THE TRAFFIC COUNTING META DATA;

↓

STEP 356: TRANSMITTING, BY THE CENTRAL CONTROLLER, TO THE AT LEAST ONE VIDEO UNIT, A COMMAND TO RE-PROCESS THE TRAFFIC COUNTING EVENT WITH A DIFFERENT ALGORITHM, IF THE IDENTIFIED TRAFFIC COUNTING EVENT REQUIRES THE DIFFERENT ALGORITHM FOR ANALYSIS; AND

↓

STEP 358: RE-PROCESSING, BY THE AT LEAST ONE VIDEO UNIT, THE TRAFFIC COUNTING EVENT WITH THE DIFFERENT ALGORITHM AND ENCODING TRAFFIC META DATA CHARACTERIZING THE RE-PROCESSED TRAFFIC COUNTING EVENT, THE AT LEAST ONE VIDEO UNIT TRANSMITTING THE META DATA CHARACTERIZING RE-PROCESSED TRAFFIC COUNTING EVENT TO THE CENTRAL CONTROLLER.

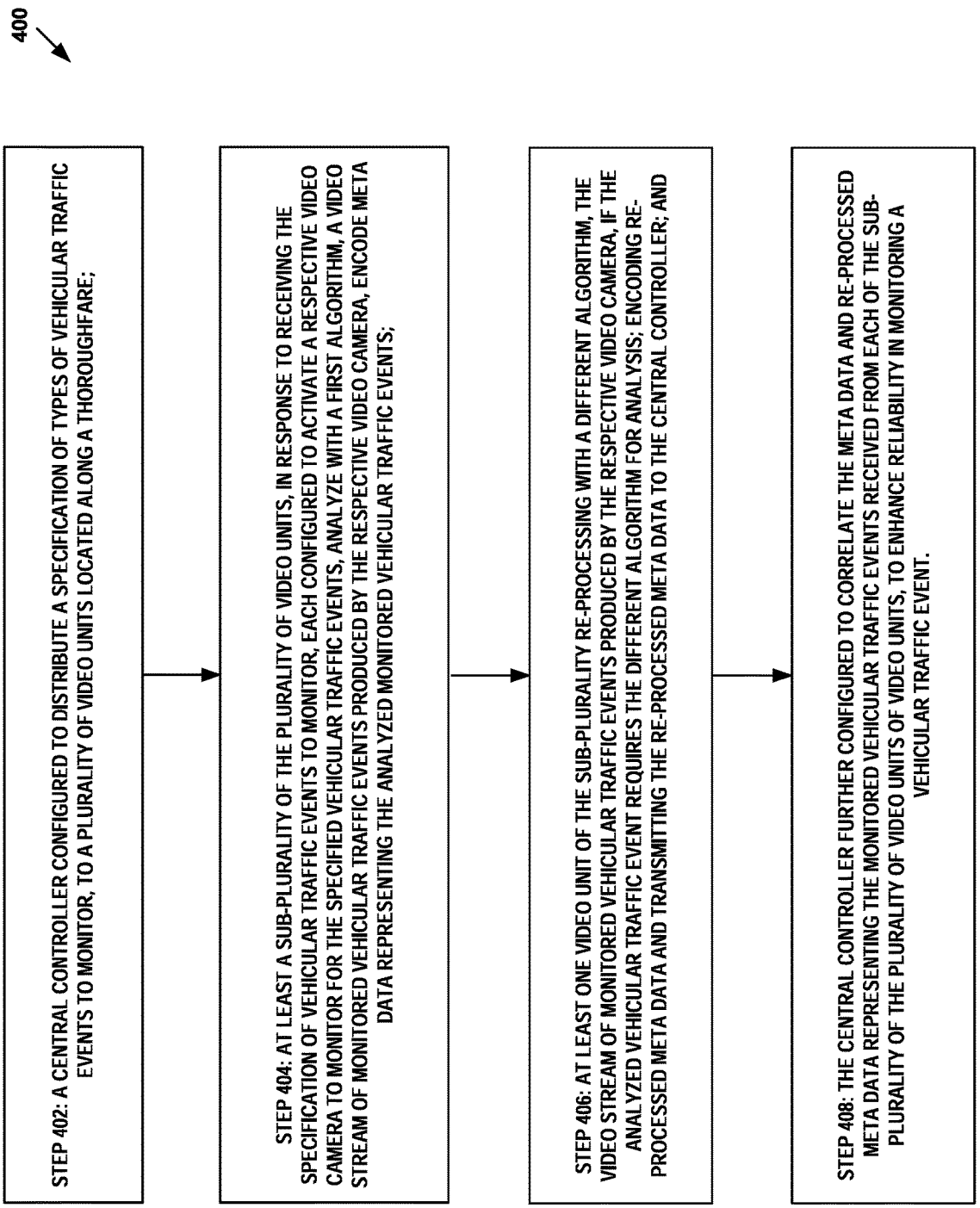

DISTRIBUTED SYSTEM FOR MINING, CORRELATING, AND ANALYZING LOCALLY OBTAINED TRAFFIC DATA INCLUDING VIDEO

FIELD OF THE INVENTION

The invention disclosed broadly relates to traffic counting, and more particularly relates to Correlating, Analyzing and Mining Locally Obtained Traffic Data including Video.

BACKGROUND OF THE INVENTION

The ability to "count things" is important for many business and government reasons. One especially important reason is to acquire the underlying data necessary to take actions that smooth the flow of goods and services, expedite emergency vehicles and, in general, improve the quality of human life. Counts about human activity such as vehicle traffic, traffic conditions, traffic situations and the type of traffic are beginning to feed into rudimentary traffic or information management systems that attempt to process massive amounts of sensor and raw video data to answer questions such as: who is using the road? How much capacity do we need? Where are they going? And do travelers and goods get there on time? To avoid too much data, most information is gleaned from scalar sensors or transmitted intermittent images which provide limited information and usually miss the big picture. Accurate information is essential for policymakers, traffic managers and drivers alike. In this regard, entire systems are starting to be created to mine valuable information embedded in real time traffic video and associated information (counts, occupancy, type of vehicle, road conditions, etc.) but these systems do not correlate data among sensors nor images. They are severely constrained by the massive amounts of data needed for a complete picture of traffic activity requiring huge storage and communications requirements. Today's systems are effectively one-pass data collection entities and are also hobbled by energy limitations, costs, inability to effectively search video, inability to correlate multiple data inputs and the limiting reality of restricted bandwidth multi-hop communications in sensor network deployments.

The ongoing problem with deploying sensors in general is the appetite for new types of data (including new types of sensors) is always growing, which is driving technology to evolve from simple scalar traffic counting to more complex traffic classification technology while feeding into rudimentary smart traffic guidance and management systems for smart cities as part of the expanding role of IoT in everyday lives. Counting vehicles, people and things (products on assembly lines, pallets of goods, people in vehicles, types of vehicles, speeds, etc.) is emerging as another key class of "killer applications" that will greatly assist in driving IoT deployments.

Today, it's amazing what a single camera can do with sophisticated traffic analyzing software. Due to Moore's Law, processing has become very inexpensive compared to the cost of massive video and sensor transmission infrastructures supporting a large and growing number of video feeds mixed in with sensor data. The key problem is to flexibly mine the information embedded into the video data and combine it with other sensor data. This allows the generation of much more efficient and compact meta data (a set of data that describes and gives information about other data.) and not needlessly move raw video data around an energy and capacity constrained network. Instead, because of economic trends it is feasible to attach programmable processors to the data collection points to reduce data volumes and efficiently manage the energy needed to power the network sensors and video nodes to provide the highest monitoring coverage.

Correlating video and sensor data at the network edge is also an unsolved problem. Data collected by today's rudimentary sensor networks have simple scalar forms with less information which makes processing simple (typically simple calculations of addition, subtraction, division, sums, and averages for example are generated). It is difficult to form a comprehensive understanding of an environment based on simple scalar information. On the other hand, videos and images collected by a video sensor network are rich in information, but have complicated forms. They are sometimes compressed (often lossey compression) and sent to back-end servers to be processed (formatted, integrated, analyzed . . . etc.) to meet diverse application requirements. Increasingly, new applications cannot be supported by typical scalar sensor networks because they require vast amounts of information which can only be obtained from an image or video. In addition, image and video data can be "mined" as information through repeated re-analysis of the image or video as often as necessary through the application of different algorithms. The application of the algorithms could be driven by information obtained from other sensor data through collaboration within the IoT environment. Scalar data, on the other hand, is often a single or group of values which represents limited information and is insufficient for many applications such as video surveillance and traffic monitoring. Camera sensors collect video data, which are rich in information and offer tremendous potential when analysis is also event driven and coupled with existing wireless or power line connected sensor networks. This combination of factors gives the most complete information in an efficient form. Due to the lack of flexible sensors, energy requirements, network connectivity and video platforms there has been little progress on a whole system approach for flexible and collaborative IoT sensor environments. Among the needed improvements, systems need to adjust camera aim and coordinate data from multiple cameras including 2D to 3D, manage many camera angles and correlate the video data with additional sensors, do multipass analysis to mine for additional information when needed . . . etc. Collaborative processing has other advantages such as increasing system robustness and improving the performance of IoT environments.

SUMMARY OF THE INVENTION

Example embodiments of the invention solve the problem of mining, correlating and analyzing locally obtained traffic video data. Example embodiments of the invention comprise a central controller, including a processor and memory including computer program code configured to cause the controller to mine and correlate traffic counting meta data gathered at a thoroughfare. The controller further includes a communications unit configured to transmit the control information to specify one or more traffic counting events to be monitored by at least one video unit located at the thoroughfare and to receive the traffic counting meta data from the at least one video unit. The central controller is configured to include or have access to large databases related to traffic counting and is configured to execute data mining algorithms on those databases triggered in response to particular traffic counting events identified by the at least one video unit located at the thoroughfare.

The at least one video unit is located at the thoroughfare, including a video camera, video frame processing logic, a processor and memory including computer program code configured to cause the video frame processing logic to process a video stream from the video camera while monitoring the traffic counting events at the thoroughfare specified by the central controller. The at least one video unit is configured to identify a traffic counting event associated with the thoroughfare, to analyze the traffic counting event, and to encode traffic meta data characterizing the analysis of the traffic counting event. The at least one video unit is configured to have access to large databases related to traffic counting and is configured to execute data mining algorithms triggered in response to particular traffic counting events and create detailed meta data to send to the central controller. The at least one video unit includes a communications unit configured to transmit the meta data characterizing analysis of the traffic counting event to the central controller.

In accordance with an example embodiment of the invention, the communications unit in the at least one video unit may be configured to transmit low bandwidth event messages to the central controller over a communications medium that may range from a high speed communications protocol to a low bandwidth protocol. Examples of a low bandwidth protocol include twisted pair, coax cable, Ethernet, Infrared, RFID, WiFi, Bluetooth, Bluetooth Low Energy, ultra-narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network. The communications unit in the central controller may be configured to receive the event message from the at least one video unit over the communications medium.

In accordance with an example embodiment of the invention, the communications unit in the at least one video unit may be a power line communications unit is configured to transmit an event message over installed power lines to the central controller. The communications unit in the central controller is a power line communications unit, configured to receive event messages over installed power lines from the at least one video unit.

In accordance with an example embodiment of the invention, a sensor is located at the at least one video unit, configured to sense distance and motion of a vehicle, the at least one video unit, configured to prepare an event message representing the vehicle's position and motion sensed by the sensor. The central controller further configured to receive event messages and to track the vehicle as it moves in the thoroughfare.

In accordance with an example embodiment of the invention, a sensor viewing the thoroughfare, is configured to detect an approach of a vehicle and transmit a signal indicating the approaching vehicle.

DESCRIPTION OF THE FIGURES

FIG. 2E illustrates an example embodiment of the invention, showing a system flow diagram of an example distributed interaction between the central controller and a video unit performing traffic counting operations, including data mining and looping operations.

FIG. 3 illustrates an example embodiment of the invention, showing a system flow diagram of an example the operation of the traffic counting system.

FIG. 4 illustrates another example embodiment of the invention, showing a system flow diagram of an example the operation of the traffic counting system.

DISCUSSION OF THE PREFERRED EMBODIMENTS

Example embodiments of the invention solve the problem of mining, correlating and analyzing locally obtained traffic video data. Example embodiments of the invention comprise a central controller, including a processor and memory including computer program code configured to cause the controller to correlate traffic counting meta data gathered at a thoroughfare, the controller further including a communications unit configured to transmit the control information to specify one or more traffic counting events to be monitored by at least one video unit located at the thoroughfare and to receive the traffic counting meta data from the at least one video unit. The central controller may include or have access to large databases related to traffic counting and may execute data mining algorithms on those databases, triggered in response to particular traffic counting events identified by the at least one video unit located at the thoroughfare.

The at least one video unit is located at the thoroughfare, including a video camera, video frame processing logic, a processor and memory including computer program code configured to cause the video frame processing logic to process a video stream from the video camera while monitoring the traffic counting events at the thoroughfare specified by the central controller, to identify a traffic counting event associated with the thoroughfare, to analyze the traffic counting event and to encode traffic meta data characterizing the analysis of the traffic counting event analyzed by the at least one video unit at the thoroughfare. The at least one video unit may have access to large databases related to traffic counting and may execute data mining algorithms triggered in response to particular traffic counting events and create detailed meta data to send to the central controller. The at least one video unit includes a communications unit configured to transmit the meta data characterizing analysis of the traffic counting event to the central controller.

Figure 1A:
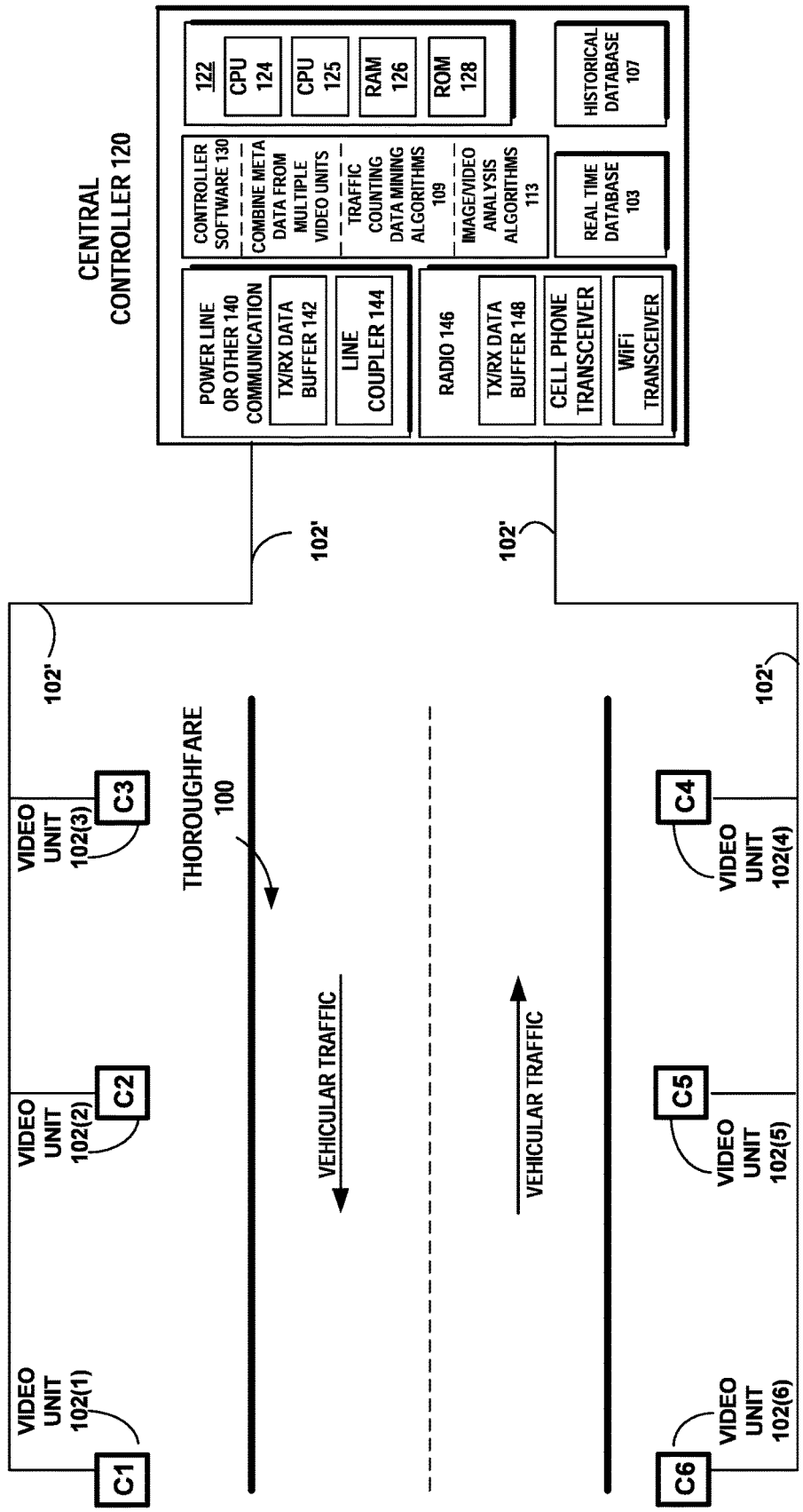
FIG. 1A illustrates an example embodiment of the invention, a central controller, includes a processor and memory including computer program code configured to cause the controller to correlate traffic counting meta data gathered at a thoroughfare. The central controller further includes a communications unit configured to transmit the control information to specify one or more traffic counting events to be monitored by at least one video unit located at the thoroughfare and to receive the traffic counting meta data from the at least one video unit. The central controller may include or have access to large databases related to traffic counting and may execute data mining algorithms on those databases, triggered in response to particular traffic counting events identified by the at least one video unit located at the thoroughfare.

FIG. 1 illustrates an example embodiment of the invention, wherein a traffic counting system comprises a traffic counting central controller 120. The thoroughfare 100 may be a street or other roadway. The traffic counting controller 120 includes a processor 122 comprising a dual central processor unit (CPU) or multi-CPU 124/125, a random access memory (RAM) 126 and read only memory (ROM) 128. The memories 126 and/or 128 include computer program code, including traffic counting software 130 and programmable image and video analysis algorithms 113. The central controller 120 may include a real time database 103 and may include or have access to a historical database 107 related to traffic counting. The central controller 120 may execute data mining algorithms 109 on the real time and historical database, triggered in response to particular traffic counting events identified by the at least one video unit located at the thoroughfare. A display device and graphical user interface may be connected to the central controller 120. The central controller 120 is configured to distribute a specification of the types of vehicular traffic events to monitor, to a plurality of video units 102(1), 102(2), 102(3), 102(4), 102(5), and 102(6) located along the thoroughfare 100.

In response to the specification of the types of vehicular traffic events to monitor, several of the video units 102(1), 102(2), 102(3), 102(4), 102(5), and 102(6) may be activated by their respective sensors that sense vehicular traffic, to activate their video cameras to search for and monitor the specified vehicular traffic events. The video units may analyze the video streams of the monitored events produced by their video cameras. The video units may perform image recognition of the video stream, to recognize a vehicle type, manufacturer, color, features such as a moon roof, damage on the vehicle, license plate number etc, or any combination of recognizable vehicle characteristics. The recognized vehicle characteristics are analyzed and encoded as meta data at each of several video units that view the vehicle. In addition, the event recognition may trigger additional video analysis algorithms that gather more information, such as gauging vehicle directions and speeds after a collision event is detected. The video units may transmit the meta data over communication paths 102' to the central controller 120. The meta data may include the geographic coordinates of each transmitting video unit and a time stamp indicating the time of occurrence of the monitored event. At any time, the central controller 120 may send new analysis algorithms to the video units. The video unit is configured to perform data mining to access and evaluate previous traffic counting data stored in a historical database, to identify patterns in traffic events related to at least one of road capacities, road congestion related to weather conditions, day of the week, delays due to road maintenance or collisions, encoding the identified patterns as meta data and transmitting the meta data to the central controller.

The central controller 120 may direct the video unit to generate additional meta data with selection of another analysis algorithm at the video unit or the central controller may send new algorithms to the video units to be utilized for a subsequent analysis. Also, the central controller 120 is configured to correlate the traffic monitoring meta data received over communication paths 102' from the plurality of video units 102(1), 102(2), 102(3), 102(4), 102(5), and 102(6) located along the thoroughfare 100. The correlation of the input meta data from multiple video units may be based on the identified vehicle characteristic represented in the meta data, such as vehicle type, manufacturer, color, features such as a moon roof, damage on the vehicle, license plate number etc, or any combination of identified vehicle characteristics. The meta data from the several video units is correlated at the central controller 120 to enhance the reliability of the recognized vehicle characteristic and vehicular traffic event. The central controller 120 may instruct one or more video units to re-analyze the image or video data and return additional meta data.

The traffic counting central controller 120 includes a communications unit 140 that may be a power line communications protocol or another protocol that may range from a high speed communications protocol to a low bandwidth protocol. The traffic counting central controller 120 also includes a radio communications unit 146 that may include a cell phone transceiver and/or a WiFi transceiver and/or Bluetooth and/or other radio communications device. The communication units 140/146 each include a transmit/receive (TX/RX) buffer 142/148 and a power line or other medium coupler 144 or radio. The communication units 140/146 are coupled to a plurality of video units 102(1), 102(2), 102(3), 102(4), 102(5), and 102(6) located along the thoroughfare 100. The plurality of video units transmit traffic meta data characterizing the analysis of the traffic counting event analyzed by the at least one video unit at the thoroughfare. Transmission is over the communications path 102', which may be a power line operated as a communication link. The communications path 102' may range from a high speed communications protocol to a low bandwidth protocol. Examples of a low bandwidth communication path 102' may include twisted pair, coax cable, Ethernet, Infrared, RFID, WiFi, Bluetooth, Bluetooth Low Energy, ultra-narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network.

Figure 1B:
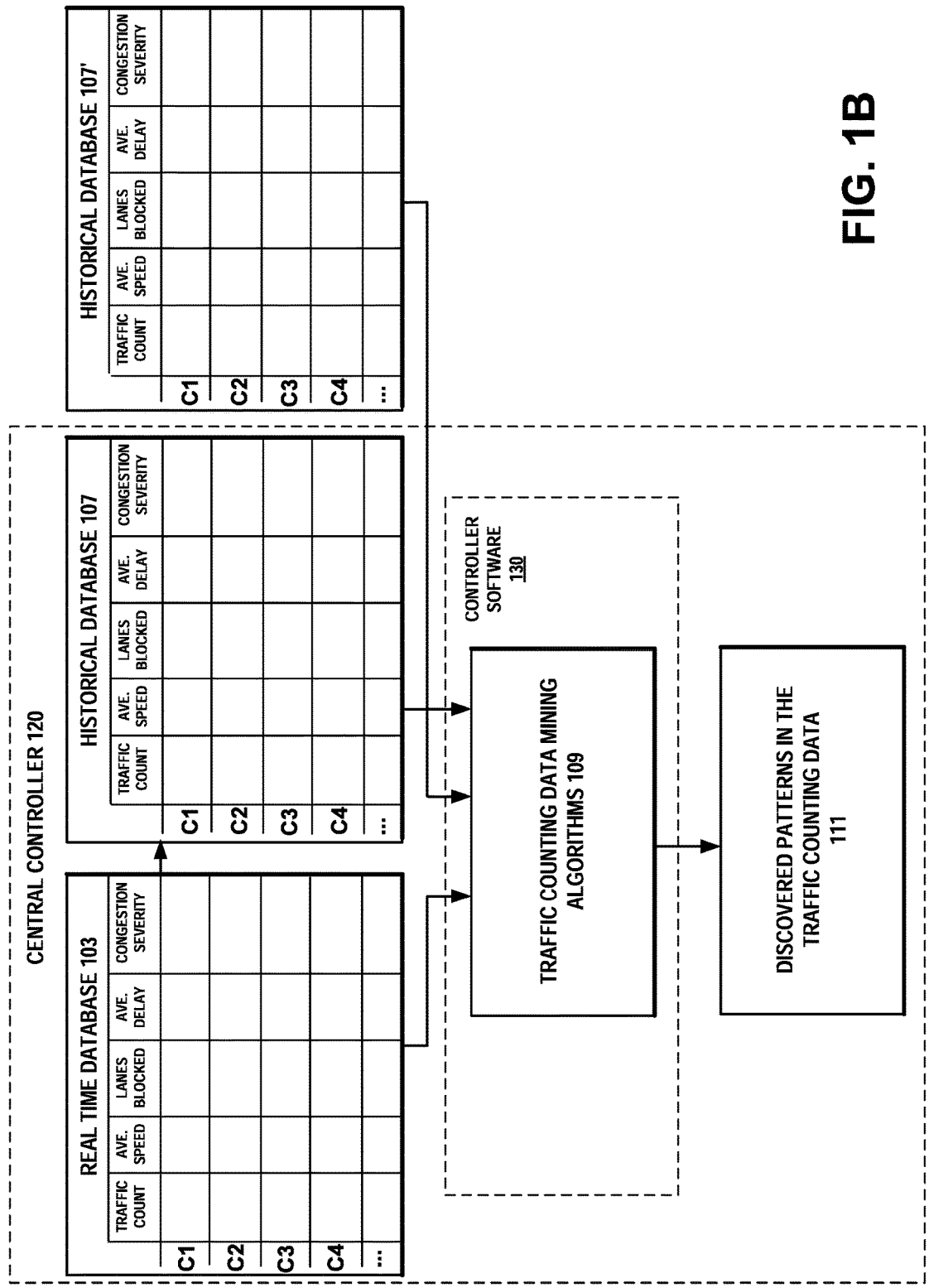
FIG. 1B illustrates a more detailed example embodiment of the central controller, showing the real time data register, historical database, traffic counting data mining algorithms, and discovered patterns in the traffic counting data.

FIG. 1B illustrates a more detailed example embodiment of the central controller 120, showing the real time database 103, historical database 107, traffic counting data mining algorithms 109, and discovered patterns in the traffic counting data 111. Also not shown, but optionally included, is a database for video storage at the local video units, which may be retrieved by a central controller on-demand, or the video may be replayed and reanalyzed locally over and over as detected events or commands from a central controller. A remotely located historical database 107' may supplement the historical database 107 in the central controller 120. The real time database 103 stores traffic counting meta data received in real time from the video units C1 102(1), C2 102(2), C3 102(3), C4 102(4), C5 102(5), and C6 102(6) located along the thoroughfare 100. Categories of traffic counting data stored in the real time database 103 from each video unit C1, C2, C3, C4, etc. may include traffic count, average speed of vehicles, lanes blocked, average delay, congestion severity, types of vehicles, and other characteristics or events represented by the received meta data. Periodically, for example at the end of each day, the traffic counting data stored in the real time database 103 is transferred over to the historical database 107, maintaining the same categories of traffic counting data that were stored in the real time database 103 from each video unit C1, C2, C3, C4, etc.

The traffic counting data mining algorithms 109 access compare and evaluate the traffic counting data stored in the historical database 107 to analyze traffic related issues concerning road capacities, road congestion related to weather conditions, day of the week, delays due to road maintenance or collisions. The discovered patterns in the traffic counting data 111 buffers the results of the analysis of the traffic related issues by the traffic counting data mining algorithms 109.

Figure 2:
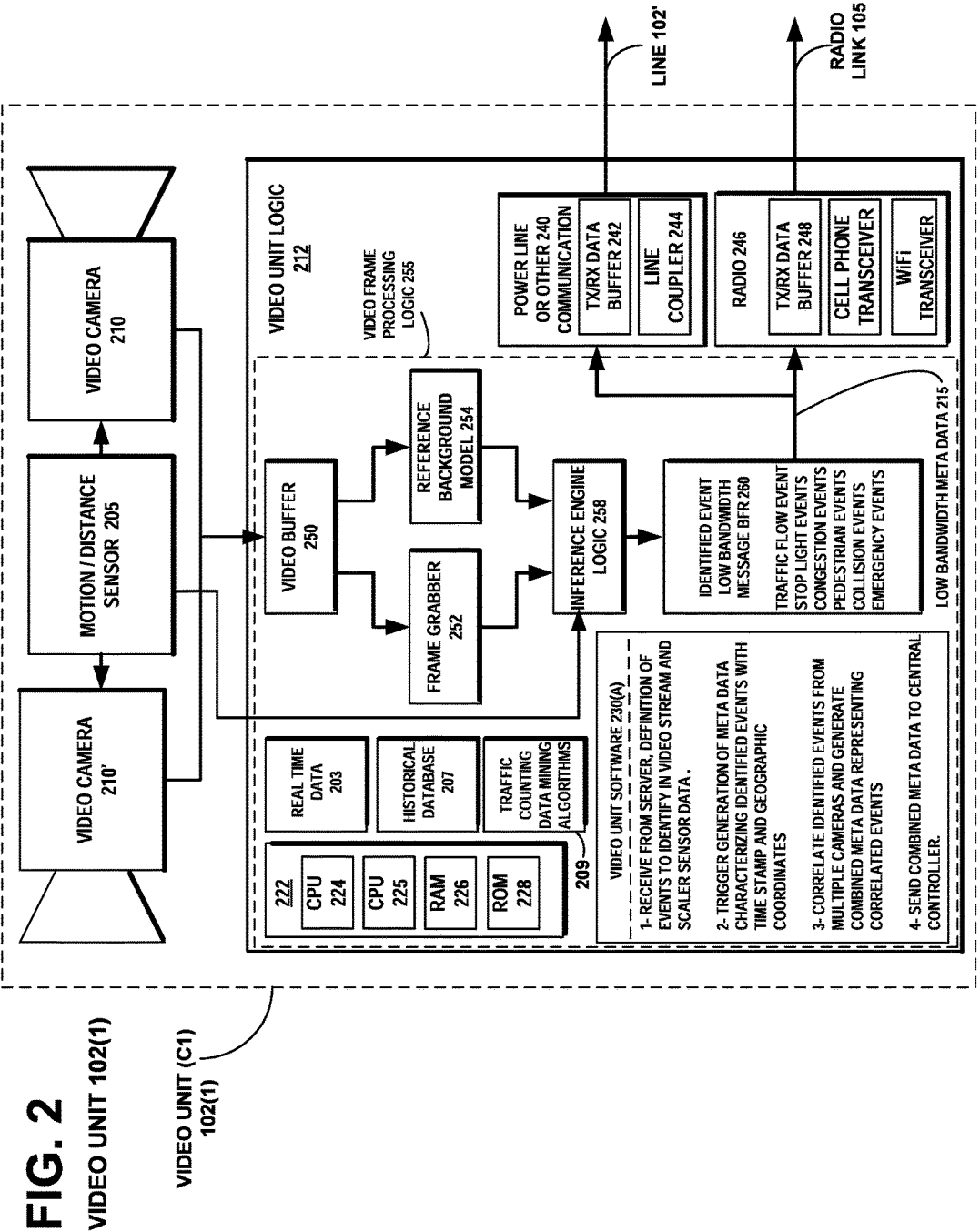
FIG. 2 illustrates an example embodiment of the invention, showing the at least one video unit located at the thoroughfare, including a video camera, video frame processing logic, a processor and memory including computer program code. The at least one video unit is configured to cause the video frame processing logic to process a video stream from the video camera while monitoring the traffic counting events at the thoroughfare specified by the central controller. The at least one video unit is configured to identify a traffic counting event associated with the thoroughfare, to analyze the traffic counting event, and to encode traffic meta data characterizing the analysis of the traffic counting event analyzed by the at least one video unit at the thoroughfare. The at least one video unit may have access to large databases related to traffic counting and may execute data mining algorithms triggered in response to particular traffic counting events and create detailed meta data to send to the central controller. The at least one video unit includes a communications unit configured to transmit the meta data characterizing analysis of the traffic counting event to the central controller.

FIG. 2 illustrates an example embodiment of the invention, showing the at least one video unit 102(1) located at the thoroughfare 100. The video unit 102(1) includes a video camera 210, a second video camera 210', and video frame processing logic 255 comprising a video buffer 250, frame grabber 252, reference background model 254, and inference engine logic 258. The video unit also includes analysis algorithms, which may be the result of pre-programmed deterministic actions or AI driven. The reference background model 254 is a program construct stored in the RAM 226, which is a learned model that looks at background in various lighting, color temperature, shadow and other conditions. The sensor 205 viewing the thoroughfare, senses the approach of a car. The video unit, for example 102(1), is configured to receive a signal from the sensor 205 indicating a traffic event such as the approach of a car, to enable the video unit 102(1) to capture any identification data requested due to programming such as the number on the license plate of the car, or a windshield or bumper sticker, etc.

The video cameras 210 and 210' comprise an image sensor plus a 3D sensor, including a red, green, blue (RGB) sensor plus an infrared (IR) sensor.

Figure 2A:
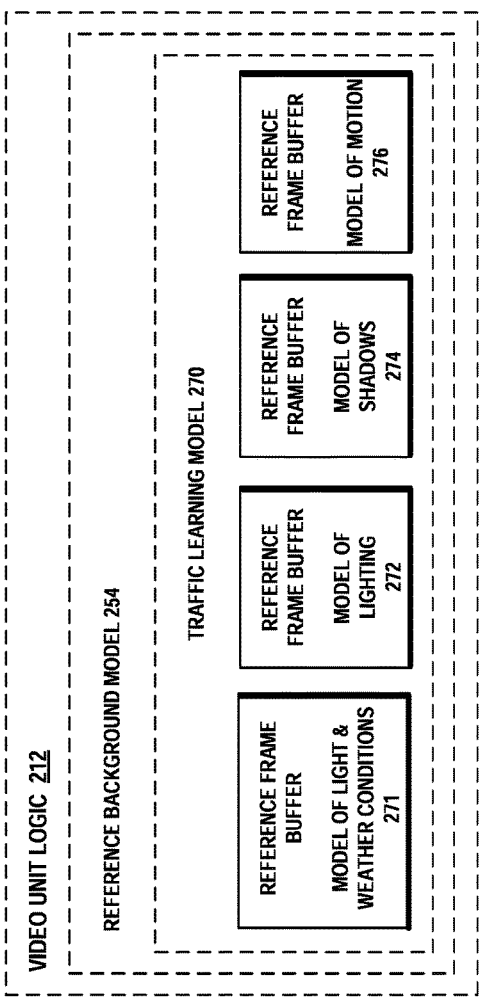
FIG. 2A illustrates an example embodiment of a reference background model in the at least one video unit.

The reference background model 254 shown in FIG. 2A, includes a traffic learning model 270, which includes, but is not limited to, multiple reference frame buffers for different light and weather conditions 271, a model of lighting 272, a model of shadows 274, and a model of motion 276.

For example, the model of light and weather conditions 271 takes as an input, the current time of day and the level of solar illumination on cloudy versus sunny days. The light and weather model 271 correlates, over time, the background light level illuminating the thoroughfare, based on the time of day and the level of solar illumination. The light and weather model 271 assigns a score to various background light levels. For a current time of day and the level of solar illumination, the light and weather model 271 provides the corresponding score to the inference engine 258, as one of the factors used by the inference engine in determining the occurrence of reportable event being monitored.

The video frame processing logic 255 processes the video stream from the video camera 210 while monitoring a thoroughfare, to identify an event. The video unit 102(1) also includes a motion/distance sensor 205 that senses the motion and distance of objects, such as moving a car in the thoroughfare 100 and triggers the video camera 210 to turn on or start recording. The motion/distance sensor 205 inputs event signals for detected motion and distance to the inference engine logic 258.

Figure 2B:
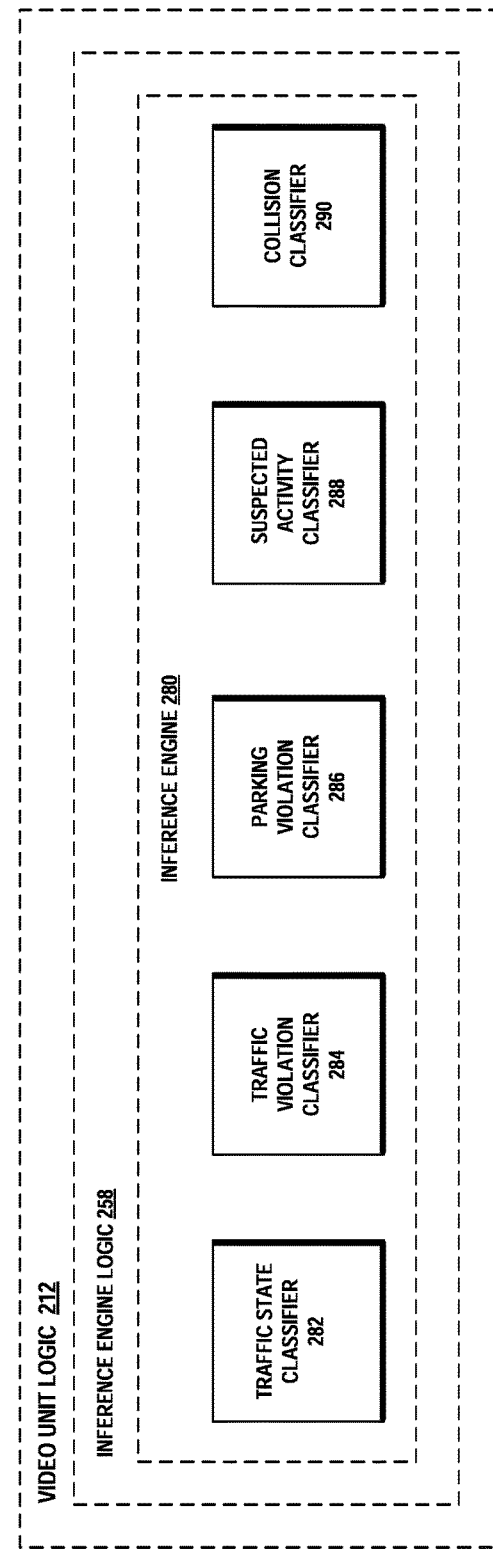
FIG. 2B illustrates an example embodiment of an inference engine logic in the at least one video unit.

The inference engine logic 258 shown in FIG. 2B, comprises an inference engine 280, which includes, but is not limited to, multiple classifiers. Examples of classifiers are: 1. traffic state classifier 282; 2. traffic violation classifier 284; 3. parking violation classifier 286; 4. Suspected activity classifier 288; and 5. Collision classifier 290. The inference engine logic 258 is a program construct stored in the RAM 226. The inference engine logic 258 outputs traffic counting meta data that identifies a traffic counting event associated with the thoroughfare. The inference engine logic 258 analyzes the traffic counting event and to encodes traffic meta data characterizing the analysis of the traffic counting event. Examples of meta data output by the inference engine logic 258 includes the following:

number of vehicles time stamps location (GPS coordinates, address, etc.)

classification (car motorcycle, bus, truck, limo etc.)

lane occupancy flow per lane speed of each object (car, truck etc.)

average speed—collect information on the average speed of vehicles passing through a road way (separated by vehicle classification type if required).

color search—perform an color based search of people or vehicles, to quickly find suspicious objects after an event has occurred.

exportable CSV—Export event information, including vehicle speeds, counts, and classification data, to share with partners or ingest into other tools.

no exit—detect if a car has parked and no one has left the vehicle. This is useful to detect suspicious activity pedestrian activity—detect when pedestrians are too close to the roadway or gathering on the side of the road.

pedestrian crosswalk safety and counting—count pedestrians as they walk along sidewalks or crosswalks, ensure pedestrian safety, or detect when people jaywalk, etc.

person/vehicle classification—effortlessly set up classification to detect between people and vehicles, and then more closely classify between vehicle types—cars, trucks, motorcycles, and more.

information to mark the start date of videos being processed, and assign specific time periods to events based on the video start date/time.

smoke/fire detection—visually detect if a fire has occurred in the monitored through-fare area. standard smoke and fire detectors do not work well outdoors, our visual detector will notify you right away.

speeding vehicle—detect and provide information about vehicles speeding through traffic scenes. Speeding vehicles are unsafe, but can be hard to catch.

stopped vehicle—detect a vehicle idling in a suspicious location, whether they have broken down or are illegally parked.

track summaries—after-the-fact review track summaries and snapshots of people or vehicles as they move through the scene. Search for tracks based on location, color, and classification to effortlessly go through processed video, without needing to re-process.

traffic heat map—generate a heat map to see an overview of traffic information and provide intuitive demonstration tools for presentations (heat map: a graphical representation of data where the individual values contained in a matrix are represented as colors)

turn count—count vehicles following specific tracks through the roadway. Differentiate the counts between where vehicles came from and where they turned.

vehicle classification: truck, car, motorcycle—Quickly and easily classify between vehicle types, including truck, motorcycle, car, and more. Use this classification information in each of the other event types, including speed, counting, idling objects, and more wrong way—detect vehicles or people going against the flow of traffic.

For example, the traffic violation classifier 284 applies a sequence of IF-THEN rules to a knowledge base of data, such as the level of a particular traffic and standards. The traffic learning model factors 270, such as the score received from the light and weather model 271, are used in analyzing the current video frame received from the frame grabber 252, to derive a measurement of the current level of traffic. The measurement of the current level of traffic is then compared to standards of traffic, using the IF-THEN rules. If the measurement of the current level of traffic is less than a certain value, then the inference engine logic 258 outputs a "acceptable traffic" indication as the identified event, which is encoded as a low bandwidth event message 215 and transmitted by the video unit 102(1) to the controller 120. Alternately, if the measurement of the current level of traffic is so great as to be an indication of congestion, then the inference engine logic 258 outputs a "congestion" indication as the identified event, which is encoded as a low bandwidth meta data event message 215 and transmitted by the video unit 102(1) to the controller 120. The congestion indication may trigger locally, or from the central controller 120, a command to utilize another algorithm to obtain additional information about the congestion. For example, congestion may be detected by low speeds or the same vehicle in a large number of contiguous frames. Another algorithm may be employed to inspect the road surface for pot holes or obstructions or analyze the off road surroundings for activity causing "rubbernecking" that slows traffic.

The video unit 102(1) is configured to encode a low bandwidth message characterizing the event. The video unit 102(1) includes a power line or other medium communications unit 240 that includes a transmit/receive (TX/RX) buffer 242 and a power line or other low bandwidth medium coupler 244, configured to transmit the low bandwidth message to the management controller 120 over power line or other medium 102'. In an alternate embodiment, the video unit 102(1) includes a radio unit 246 that includes a transmit/receive (TX/RX) buffer 248, a cell phone transceiver, and a WiFi transceiver, which are configured to transmit the low bandwidth message to the management controller 120 over a radio link 105.

The video unit 102(1) includes a processor 222 comprising a dual central processor unit (CPU) or multi-CPU 224/225, a random access memory (RAM) 226 and read only memory (ROM) 228. The memories 226 and/or 228 include computer program code, including video unit software 230(A) and storage for analysis algorithms. The identified event low bandwidth message buffer 260 may include example meta data messages 215, such as: traffic flow event, stop light events, congestion events, pedestrian events, collision events, and emergency events.

The video unit software 230(A) includes analysis algorithms and example instructions such as the following:

1—receive from server, definition of events to identify in video stream and scalar sensor data.

2—trigger generation of meta data characterizing identified events with time stamp and geographic coordinates 3—correlate identified events from multiple cameras and generate combined meta data representing correlated events 4—send meta data to central controller.

The video unit software 230(A) includes analysis algorithms, such as for analyzing traffic flow events, for example as follows:

Traffic Flow Event

[1] receive command from central controller to monitor traffic flow;

[2] form a mapping relationship between reference locations in the camera's perspective view of the roadway with geographic coordinates corresponding to the reference locations;

[3] monitor vehicle motion using the mapping relationship of the perspective view of a vehicle moving along the roadway;

[4] map the motion of the image of the vehicle, as seen in the camera, onto geographic coordinates of the moving vehicle; and

[5] measure the traffic flow event from the vehicle's motion derived from its map coordinates.

Other analysis algorithms in the video unit software 230(A) may include analysis of stop light events, congestion events, pedestrian events, collision events, and emergency events.

The example embodiment of the invention has the advantage of working over restrictive low bandwidth communication links, however it is not restricted to low bandwidth and works over higher bandwidth communication links.

Figure 2C:
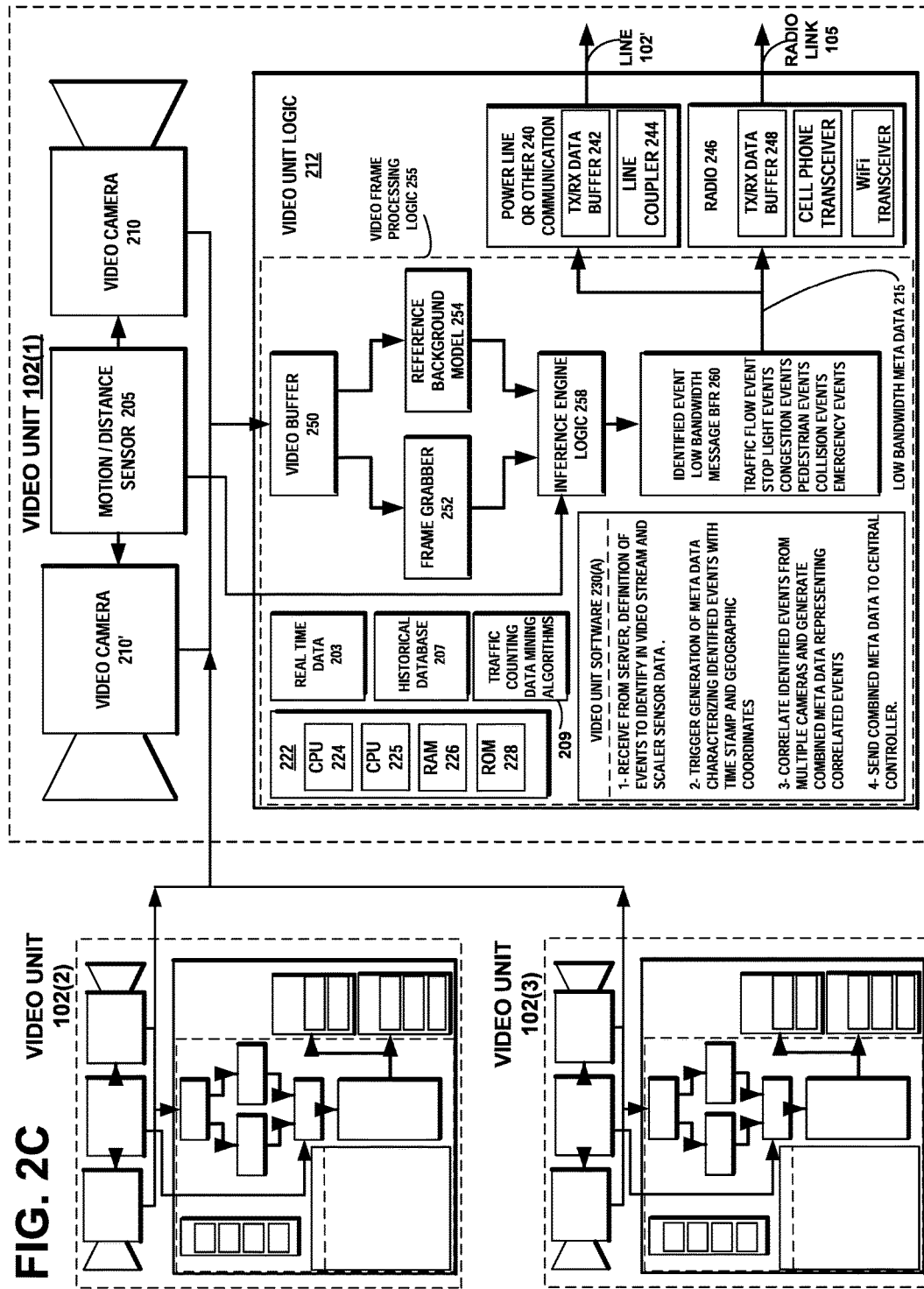
FIG. 2C illustrates an example embodiment of three video units located at three different locations along the thoroughfare and monitor the same event, with two of the video units feeding their respective video streams to the third video unit. The third video unit processes all three video streams, analyzes and combines multiple views of the same event. The third video unit may include or have access to large databases related to traffic counting and may execute data mining algorithms triggered in response to particular traffic counting events and create detailed meta data to send to the central controller. The meta data may comprise a reduced amount of information representing the multiple views of the same event.

FIG. 2C illustrates an example embodiment of three video units 102(1), 102(2), 102(3), located at three different locations along the thoroughfare 100 and monitor the same event, with two of the video units 102(2) and 102(3), either feeding meta data or feeding their respective video streams to the third video unit 102(1). The third video unit 102(1) processes all the meta data or the three video streams, analyzes and combines multiple views of the same event. The third video unit 102(1) sends meta data to the central controller 120, comprising a reduced amount of information representing the multiple views of the same event. If necessary, the central controller may further mine the information available in the three video views by instructing the video units to replay the video with analysis by different algorithms which may generate additional meta data. Data mining allows the reprocessing of the raw video footage (for more or different meta data), not just modifying the original meta data.

Figure 2D:
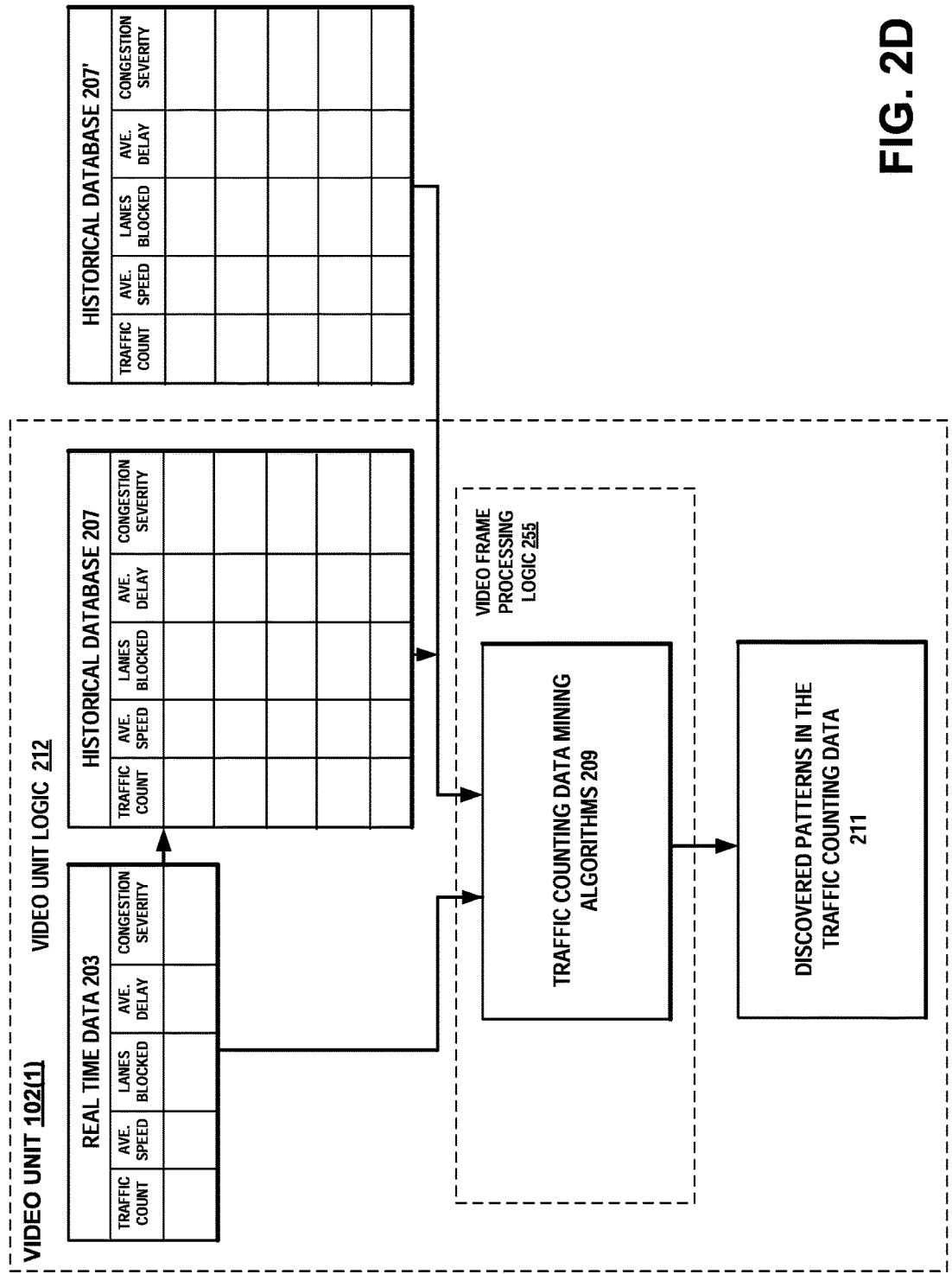
FIG. 2D illustrates a more detailed example embodiment of the video unit logic, showing the real time data register, historical database, traffic counting data mining algorithms, and discovered patterns in the traffic counting data.

FIG. 2D illustrates a more detailed example embodiment of the video unit 102(1), showing the real time data register 203, historical database 207, traffic counting data mining algorithms 209, and discovered patterns in the traffic counting data 211. Also, not shown, is a database for raw video storage at both the local distributed video units and at the central controller. This allows raw video to be replayed at either location and analyzed over and over as events dictate. A remotely located historical database 207' may supplement the historical database 207 in the video unit 102(1). The real time data register 203 stores traffic counting meta data generated in real time by the video unit C1 102(1). Categories of traffic counting data stored in the real time data register 203 by the video unit C1, may include traffic count, average speed of vehicles, lanes blocked, average delay, congestion severity, types of vehicles, weather and road conditions and other characteristics or events represented by the generated meta data. Periodically, for example at the end of each day, the traffic counting data stored in the real time data register 203 is transferred over to the historical database 207, maintaining the same categories of traffic counting data that were stored in the real time data register 203 by the video unit C1. In addition, if needed, raw video data may be transferred to the central controller.

The traffic counting data mining algorithms 209 access, compare, and evaluate the traffic counting data generated by the raw video footage stored in the historical database 207 to analyze traffic related events viewed and recorded by the video unit 102(1), concerning road capacities, road congestion related to weather conditions, day of the week, delays due to road maintenance or collisions. The discovered patterns in the traffic counting data 211 buffers the results of the analysis of the traffic related issues by the traffic counting data mining algorithms 209 in the video unit 102(1). The video unit is configured to perform data mining to access and evaluate previous traffic counting data stored in a historical database, to identify patterns in traffic events related to, for example road capacities, road congestion related to weather conditions, day of the week, or delays due to road maintenance or collisions.

FIG. 2E illustrates an example embodiment of the invention, showing a system flow diagram 300 of an example the distributed interaction between the central controller 120 and a video unit video unit 102(1) performing traffic counting operations, including data mining and looping operations. The steps of the flow diagram 300 represent computer code instructions stored in the RAM and/or ROM memories of both the central controller and the video unit, which when executed by the respective central processing units (CPU) of both the central controller and the video unit, to carry out the functions of the example embodiments of the invention. The steps may be carried out in another order than shown and individual steps may be combined or separated into component steps. The flow diagram has the following steps:

The Central Controller 120, Controller Software 130 performs the even numbered steps which follow. The Video Unit 102(1), Video Unit Logic 212 performs the odd numbered steps which follow.

Controller Step 302: Command: Monitor Current Traffic Flow.

Video Unit Step 303: In response, Monitor Current Traffic Flow/Generate Meta Data. Send meta data to controller.

Controller Step 304: Command: Focus On Traffic Flow In Intersection.

Video Unit Step 305: In response, Adjust Pan, Tilt, Zoom Of Camera/Monitor Intersection. Send meta data to controller.

Controller Step 306: Command: Predict Traffic Flow During Rainfall.

Video Unit Step 307: In response, Run Data Mining Algorithm/Find History During Rainfall. Send meta data to controller.

Controller Step 308: Command: Predict Traffic Flow At Night During Rainfall.

Video Unit Step 309: In response, Run Data Mining Algorithm/Find History During Night Rainfall. Send meta data to controller.

Controller Step 310: Command: Change Focus To Ramp.

Video Unit Step 311: In response, Adjust Pan, Tilt, Zoom Of Camera/Monitor Ramp. Send meta data to controller.

Controller Step 312: Command: Monitor Types Of Vehicles Using Ramp At Night.

Video Unit Step 313: In response, Run Ambient Night Vision Algorithm.

Video Unit Step 315: Evaluate Resolution/Contrast Of Image/Result Poor.

Video Unit Step 317: Run Infrared Illuminated Night Vision Algorithm.

Video Unit Step 319: Evaluate Resolution/Contrast Of Image/Result Good. Send meta data to controller.

Controller Step 320: Command: Monitor Vehicle Types Using Ramp Each Hour At Night.

Video Unit Step 321: In response, Run Infrared Illuminated Night Vision Algorithm.

Video Unit Step 323: Loop: Monitor Vehicle Types Using Ramp Each Hour At Night. Send meta data to controller.

Controller Step 324: Evaluate Vehicle Types Using Ramp Each Hour At Night.

FIG. 3 illustrates an example embodiment of the invention, showing a system flow diagram 350 of an example the operation of the data mining and traffic counting system. The steps of the flow diagram 350 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 352: processing a video stream, by at least one video unit, while monitoring traffic counting events at a thoroughfare specified by a central controller, to identify a traffic counting event associated with the thoroughfare, to analyze the traffic counting event with a first algorithm, and to encode traffic meta data characterizing the analysis of the traffic counting event analyzed by the at least one video unit at the thoroughfare, the at least one video unit transmitting the meta data characterizing analysis of the traffic counting event to the central controller;

Step 354: receiving, by the central controller, the meta data characterizing analysis of the traffic counting event, and evaluating the traffic counting meta data;

Step 356: transmitting, by the central controller, to the at least one video unit, a command to re-process the traffic counting event with a different algorithm, if the identified traffic counting event requires the different algorithm for analysis; and Step 358: re-processing, by the at least one video unit, the traffic counting event with the different algorithm and encoding traffic meta data characterizing the re-processed traffic counting event, the at least one video unit transmitting the meta data characterizing re-processed traffic counting event to the central controller.

FIG. 4 illustrates another example embodiment of the invention, showing a system flow diagram 400 of an example the operation of the traffic counting system. The steps of the flow diagram 400 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: a central controller configured to distribute a specification of types of vehicular traffic events to monitor, to a plurality of video units located along a thoroughfare;

Step 404: at least a sub-plurality of the plurality of video units, in response to receiving the specification of vehicular traffic events to monitor, each configured to activate a respective video camera to monitor for the specified vehicular traffic events, (such as vehicles stuck in a traffic jam) or vehicles moving) analyze with a first algorithm, a video stream of monitored vehicular traffic events produced by the respective video camera, encode meta data representing the analyzed monitored vehicular traffic events;

Step 406: at least one video unit of the sub-plurality re-processing with a different algorithm, the video stream of monitored vehicular traffic events produced by the respective video camera, if the analyzed vehicular traffic event requires the different algorithm for analysis; encoding re-processed meta data and transmitting the re-processed meta data to the central controller; and Step 408: the central controller further configured to correlate the meta data and re-processed meta data representing the monitored vehicular traffic events received from each of the sub-plurality of the plurality of video units of video units, to enhance reliability in monitoring a vehicular traffic events.

Although specific example embodiments of the invention have been disclosed, persons of skill in the art will appreciate that changes may be made to the details described for the specific example embodiments, without departing from the spirit and the scope of the invention.

What is claimed is:

1. A distributed system for correlating and analyzing locally obtained traffic video data, comprising:
    a central controller configured to distribute a specification of types of vehicular traffic events to monitor, to a plurality of video units located along a thoroughfare;
    at least a sub-plurality of the plurality of video units, in response to receiving the specification of vehicular traffic events to monitor, each configured to activate a respective video camera to monitor for the specified vehicular traffic events, analyze with a first algorithm, a video stream of monitored vehicular traffic events produced by the respective video camera, encode meta data representing the analyzed monitored vehicular traffic events, and transmit the meta data to the central controller;
    at least one video unit of the plurality of video units, in response to receiving the specification of vehicular traffic events to monitor, configured to activate a respective video camera of the at least one video unit to monitor for the specified vehicular traffic events, and analyze with the first algorithm, a video stream of monitored vehicular traffic events produced by the respective video camera of the at least one video unit;
    the at least one video unit of the plurality configured to determine that the analyzed vehicular traffic event requires a different algorithm for analysis, re-process with the different algorithm, the video stream of monitored vehicular traffic events produced by the respective video camera of the at least one video unit, encode re-processed meta data, and transmit the re-processed meta data to the central controller;
    a first one of the plurality of video units located at a first location along the thoroughfare and a second one of the plurality of video units located at a different location along the thoroughfare and monitoring the same event as the first one of the plurality of video units, with the second one of the plurality of video units feeding its meta data to the first one of the plurality of video units, the first one of the plurality of video units, outputting the combined meta data representing the same event, and sending the combined meta data to the central controller; and
    the central controller further configured to correlate the meta data and re-processed meta data representing the monitored vehicular traffic events received from each of the sub-plurality of the plurality of video units and the at least one video unit of the plurality of video units, in monitoring a vehicular traffic event.

2. The system of claim 1, wherein the video units are activated by respective sensors that sense vehicular traffic, to activate the respective video cameras to search for and monitor the specified vehicular traffic events.

3. The system of claim 1, wherein the video units perform image recognition of the video stream produced by the respective video camera, to recognize at least one of a vehicle type, manufacturer, color, features such as a moon roof, damage on the vehicle, license plate number or an identifying sticker displayed on the vehicle.

4. The system of claim 1, wherein the meta data includes geographic coordinates of each transmitting video unit and a time stamp indicating a time of occurrence of the monitored event.

5. The system of claim 1, wherein the central controller correlates the received traffic monitoring meta data based on an identified vehicle characteristic represented in the meta data, including at least one of vehicle type, manufacturer, color, features such as a moon roof, damage on the vehicle, license plate number, or an identifying sticker displayed on the vehicle.

6. The system of claim 1, wherein the at least one video unit of the plurality is configured to perform a loop to repetitively re-process the video stream of monitored vehicular traffic events produced by the respective video camera, repetitively encode the re-processed meta data and transmit the repetitively re-processed meta data to the central controller.

7. The system of claim 1, wherein the central controller is configured to perform a loop to repetitively re-evaluate the received meta data of monitored vehicular traffic events produced by the respective video units.

8. The system of claim 1, wherein the at least one video unit of the plurality is configured to perform data mining to access and evaluate previous traffic counting data stored in a historical database, to identify patterns in traffic events related to at least one of road capacities, road congestion related to weather conditions, day of the week, delays due to road maintenance or collisions, encoding the identified patterns as meta data and transmitting the meta data to the central controller.

9. The system of claim 1, wherein the central controller is configured to perform data mining to access and evaluate previous traffic counting data stored in a historical database, to identify patterns in traffic events related to at least one of road capacities, road congestion related to weather conditions, day of the week, delays due to road maintenance or collisions.

10. The system of claim 1, further comprising:
a communications unit in each of the video units being configured to transmit low bandwidth meta data to the central controller over a communications medium selected from the group consisting of twisted pair, coax cable, Ethernet, Infrared, RFID, WiFi, Bluetooth, Bluetooth Low Energy, ultra-narrow band communications protocol from Sigfox, LTE-M, Low Power Wireless Area Network (LPWAN) protocol, any M2M communication protocol, cellular, IEEE 802.15.4 RF, or LoRa Low Power Wide Area Network;
the communications unit in the central controller being configured to receive the low bandwidth meta data from each of the video units over the communications medium.

11. The system of claim 1, further comprising:
the communications unit in each of the video units being a power line communications unit configured to transmit low bandwidth meta data over installed power lines to the central controller;
the communications unit in the central controller being a power line communications unit, configured to receive the low bandwidth meta data over installed power lines from each of the video units; and the power line communications unit in the central controller further configured to transmit or receive data communications over installed power lines to electrically powered devices in the thoroughfare where power is needed and control desired.

12. The system of claim 1, further comprising:
a sensor located at each of the video units, configured to sense distance and motion of a vehicle, each of the video units, configured to prepare low bandwidth meta data representing the vehicle's position and motion sensed by the sensor; and
the central controller further configured to receive the low bandwidth meta data and to track the vehicle as it moves in the thoroughfare.

13. The system of claim 1, further comprising:
a sensor coupled to each of the video units, configured to view the thoroughfare and to detect an approach of a vehicle and transmit a signal to the video unit, indicating the approaching vehicle;
each of the video units configured to capture an identification of the approaching vehicle in response to the signal from the sensor and to transmit the identification to the central controller, the identification being based on at least one of a license plate number or an identifying sticker displayed on the vehicle or model and make of vehicle or color of vehicle.

14. A distributed system for correlating and analyzing locally obtained traffic video data, comprising:
a central controller, including a processor and memory including computer program code configured to cause the controller to correlate traffic counting meta data gathered at a thoroughfare, the controller further including a communications unit configured to transmit the control information to specify one or more traffic counting events to be monitored by a plurality of video units located along the thoroughfare and to receive the traffic counting meta data from at least one of the plurality of video units;
the at least one video unit located at the thoroughfare, including a video camera, video frame processing logic, a processor and memory including computer program code configured to cause the video frame processing logic to process a video stream from the video camera while monitoring the traffic counting events at the thoroughfare specified by the central controller, to identify a traffic counting event associated with the thoroughfare, and to analyze the traffic counting event with a first algorithm;
the at least one video unit further configured to determine that the analyzed traffic counting event requires a different algorithm for analysis, re-process the traffic counting event with the different algorithm, and encode re-processed meta data, the at least one video unit including a communications unit configured to transmit the re-processed meta data characterizing analysis of the traffic counting event; and
a first one of the plurality of video units located at a first location along the thoroughfare and the at least one video unit located at a different location along the thoroughfare and monitoring the same event as the first one of the plurality of video units, with the at least one video unit feeding its meta data to the first one of the plurality of video units, the first one of the plurality of video units, outputting the combined meta data representing the same event, and sending the combined meta data to the central controller.

15. The system of claim 14, further comprising:
the communications unit in the at least one video unit being configured to transmit the low bandwidth event message to the central controller over a communications medium selected from the group consisting of twisted pair, coax cable, Ethernet, Infrared, RFID, WiFi, Bluetooth, Bluetooth Low Energy, ultra-narrow band communications protocol from Sigfox, LTE-M, Low Power Wireless Area Network (LPWAN) protocol, any M2M communication protocol, cellular, IEEE 802.15.4 RF, or LoRa Low Power Wide Area Network;
the communications unit in the central controller being configured to receive the low bandwidth event message from the at least one video unit over the communications medium.

16. The system of claim 14, further comprising:
the communications unit in the at least one video unit being a power line communications unit configured to transmit a low bandwidth event message over installed power lines to the central controller;
the communications unit in the central controller being a power line communications unit, configured to receive the low bandwidth event message over installed power lines from the at least one video unit; and
the power line communications unit in the central controller further configured to transmit or receive data communications over installed power lines to electrically powered devices in the thoroughfare where power is needed and control desired.

17. The system of claim 14, further comprising:
a sensor located at the at least one video unit, configured to sense distance and motion of a vehicle, the at least one video unit, configured to prepare a low bandwidth event message representing the vehicle's position and motion sensed by the sensor; and
the central controller further configured to receive the low bandwidth event message and to track the vehicle as it moves in the thoroughfare.

18. The system of claim 14, further comprising:
a sensor coupled to the at least one video unit, is configured to view the thoroughfare and to detect an approach of a vehicle and transmit a signal to the at the at least one video unit, indicating the approaching vehicle;

the at the at least one video unit is configured to capture an identification of the approaching vehicle in response to the signal from the sensor and to transmit the identification to the central controller, the identification being based on at least one of a license plate number or an identifying sticker displayed on the vehicle or model and make of vehicle or color of vehicle.

19. A method for correlating and analyzing locally obtained traffic video data, comprising:

distributing, by a central controller configured, a specification of types of vehicular traffic events to monitor, to a plurality of video units located along a thoroughfare;

activating, at least a sub-plurality of the plurality of video units, in response to receiving the specification of vehicular traffic events to monitor, a respective video camera to monitor for the specified vehicular traffic events, and analyzing with a first algorithm a video stream of monitored vehicular traffic events produced by the respective video camera, encoding meta data representing the analyzed monitored vehicular traffic events, and transmitting the encoded meta data to the central controller;

at least one video unit of the plurality of video units, in response to receiving the specification of vehicular traffic events to monitor, activating a respective video camera of the at least one video unit to monitor for the specified vehicular traffic events, and analyzing with the first algorithm, a video stream of monitored vehicular traffic events produced by the respective video camera of the at least one video unit;

the at least one video unit of the plurality determining that the analyzed vehicular traffic event requires a different algorithm for analysis, re-processing with the different algorithm, the video stream of monitored vehicular traffic events produced by the respective video camera of the at least one video unit, encoding re-processed meta data, and transmitting the re-processed meta data;

monitoring the same event by a first one of the plurality of video units located at a first location along the thoroughfare and a second one of the plurality of video units located at a different location along the thoroughfare, with the second one of the plurality of video units feeding its meta data to the first one of the plurality of video units, the first one of the plurality of video units, outputting the combined meta data representing the same event, and sending the combined meta data to the central controller; and correlating, by the central controller, the meta data representing the analyzed monitored vehicular traffic events received from each of the sub-plurality of the plurality of video units of video units, in monitoring a vehicular traffic event.

20. A method for correlating and analyzing locally obtained traffic video data, comprising:

processing a video stream, by each of a plurality of video units, while monitoring traffic counting events along a thoroughfare specified by a central controller, to identify a traffic counting event associated with the thoroughfare, to analyze the traffic counting event with a first algorithm;

monitoring the same event by a first one of the plurality of video units located at a first location along the thoroughfare and a second one of the plurality of video units located at a different location along the thoroughfare;

determining, by the second one of the plurality of video units, that the analyzed traffic counting event requires a different algorithm for analysis, re-processing with the different algorithm, the video stream of monitored traffic counting events produced by the respective video camera of the second one of the plurality of video units, encoding re-processed meta data, and transmitting the re-processed meta data;

the second one of the plurality of video units feeding its meta data to the first one of the plurality of video units, the first one of the plurality of video units, outputting the combined meta data representing the same event, and sending the combined meta data to the central controller; and receiving, by the central controller, the re-processed meta data characterizing analysis of the traffic counting event, and evaluating the re-processed traffic counting meta data.

21. The system of claim 1, further comprising:

a first one of the plurality of video units located at a first location along the thoroughfare and a second one of the plurality of video units located at a different location along the thoroughfare and monitoring the same event as the first one of the plurality of video units, with the second one of the plurality of video units feeding its video stream to the first one of the plurality of video units, the first one of the plurality of video units, analyzing the two video streams representing two views of the same event, outputting combined meta data representing the same event, and sending the combined meta data to the central controller.

22. The system of claim 1, further comprising:

at least one of the plurality of video units, including inference engine logic configured to analyze the vehicular traffic events and to encode the meta data characterizing the analysis of the vehicular traffic events;

wherein the meta data output by the inference engine logic includes at least one of a color based search of objects after an event has occurred or a search for tracks of objects as they move through a scene based on location, color, or classification of the object; and the central controller further configured to correlate the meta data representing the monitored vehicular traffic events received from each of the sub-plurality of the plurality of video units and the at least one video unit of the plurality of video units, in monitoring a vehicular traffic event.

23. The distributed system of claim 22, further comprising:

the at least one video unit of the plurality of video units, configured to perform image recognition of the video stream, to recognize vehicle characteristics, analyze the recognized vehicle characteristics, and trigger additional video analysis algorithms to gather more information, including gauging vehicle directions and speeds after a collision event is detected.

24. The distributed system of claim 23, further comprising:

the at least one video unit of the plurality of video units, configured to perform data mining to access and evaluate previous traffic counting data stored in a historical database, to identify patterns in traffic events related to at least one of road capacities, road congestion related to weather conditions, day of the week, delays due to road maintenance or collisions, encode the identified patterns as meta data and transmit the meta data to the central controller.

\* \* \* \* \*